(12) United States Patent
Jeong et al.

(10) Patent No.: US 10,122,268 B2
(45) Date of Patent: Nov. 6, 2018

(54) VOLTAGE GENERATORS AND SYSTEMS

(71) Applicant: SK hynix Inc., Icheon-si Gyeonggi-do (KR)

(72) Inventors: Hyun Sik Jeong, Icheon-si (KR); Sang Jo Seo, Icheon-Si (KR); Tae Heui Kwon, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/849,275

(22) Filed: Dec. 20, 2017

(65) Prior Publication Data

US 2018/0115240 A1 Apr. 26, 2018

Related U.S. Application Data

(62) Division of application No. 14/965,021, filed on Dec. 10, 2015, now Pat. No. 9,882,470.

(30) Foreign Application Priority Data

Jul. 21, 2015 (KR) ........................ 10-2015-0102909

(51) Int. Cl.
*G05F 1/10* (2006.01)
*H02M 3/07* (2006.01)

(52) U.S. Cl.
CPC ................................... *H02M 3/07* (2013.01)

(58) Field of Classification Search
CPC ..................................................... G11C 5/145
USPC ........................................ 327/536, 537, 378
See application file for complete search history.

(56) References Cited

U.S. PATENT DOCUMENTS

| | | | |
|---|---|---|---|
| 5,982,222 A | 11/1999 | Kyung | |
| 6,567,309 B2 | 5/2003 | Tanzawa | |
| 7,443,230 B2 | 10/2008 | Chen et al. | |
| 7,948,303 B2 | 5/2011 | Im | |
| 2005/0195019 A1* | 9/2005 | Okamoto | G11C 5/145 327/536 |
| 2008/0315848 A1 | 12/2008 | Meyer | |
| 2010/0052771 A1 | 3/2010 | Hartono | |
| 2010/0171544 A1* | 7/2010 | Seo | G11C 5/145 327/536 |
| 2011/0133819 A1 | 6/2011 | Cook et al. | |

FOREIGN PATENT DOCUMENTS

| | | |
|---|---|---|
| CN | 1538453 A | 10/2004 |
| CN | 1855298 A | 11/2006 |
| KR | 1020040090223 A | 10/2004 |
| KR | 1020020002692 A | 1/2012 |

* cited by examiner

*Primary Examiner* — Thomas Skibinski
(74) *Attorney, Agent, or Firm* — William Park & Associates Ltd.

(57) ABSTRACT

In one example, a voltage generator includes a plurality of voltage pumps, a voltage detection circuit, an oscillator, and a control circuit. The plurality of voltage pumps are configured to perform voltage pumping operations in a sequence and output a pumping voltage. The voltage detection circuit is configured to detect a voltage level of the pumping voltage and output a detection signal. The control circuit is configured to output, in response to the detection signal, a plurality of divided oscillator signals based on an oscillator signal of the oscillator, to enable a different one of the voltage pumps to begin each sequence of voltage pumping operations each time the pumping voltage is less than a threshold voltage.

5 Claims, 10 Drawing Sheets

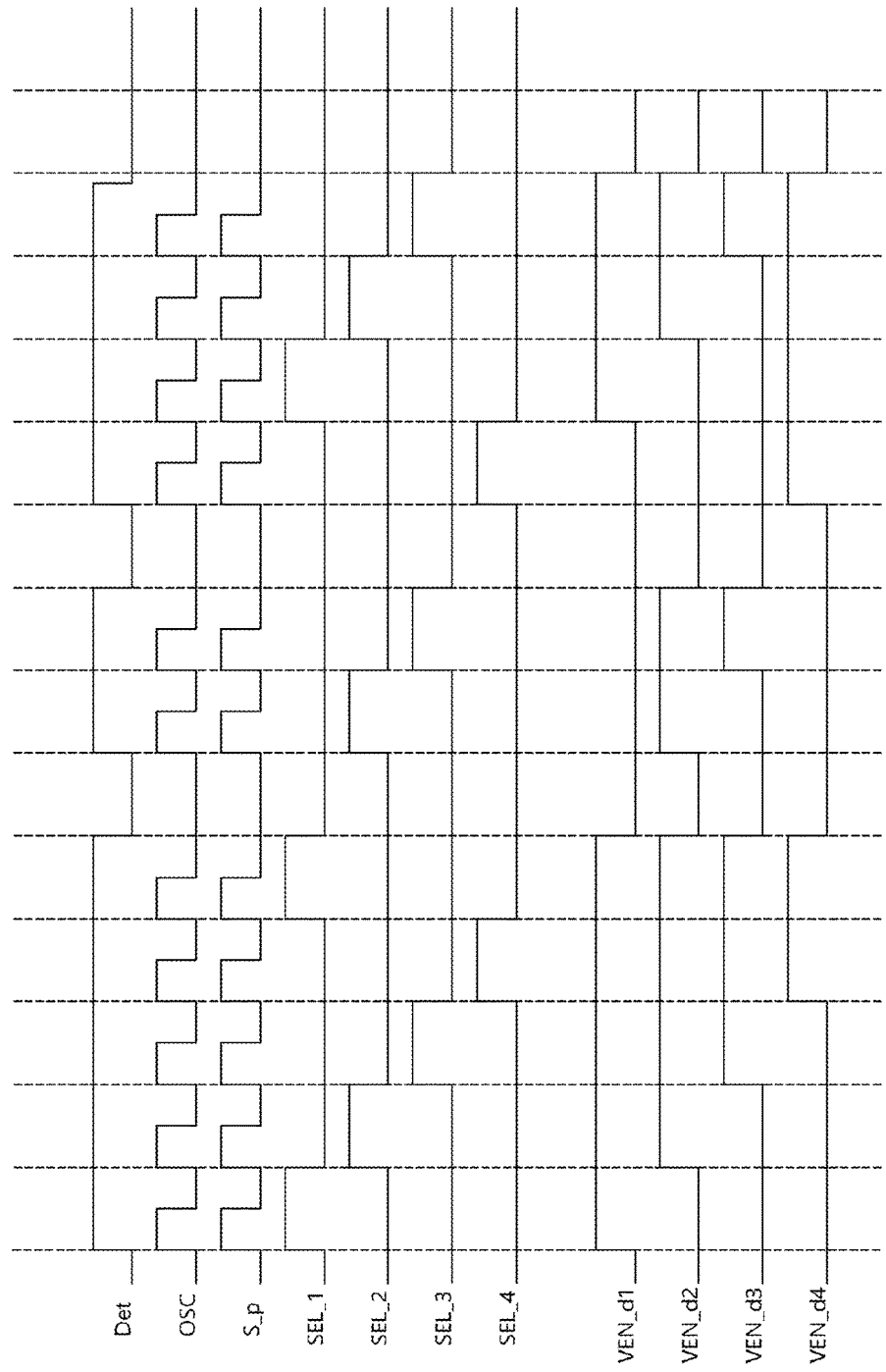

VOLTAGE GENERATORS AND SYSTEMS

CROSS-REFERENCES TO RELATED APPLICATION

The present application is a divisional application of U.S. application Ser. No. 14/965,021 filed on Dec. 10, 2015, and claims priority under 35 U.S.C. § 119(a) to Korean application number 10-2015-0102909, filed on Jul. 21, 2015, in the Korean Intellectual Property Office, which is incorporated herein by reference in its entirety.

BACKGROUND

1. Technical Field

Various embodiments generally relate to electronic circuits, such as semiconductor integrated circuits, and, more particularly, to voltage generators and systems which may include a plurality of voltage pumps or generators.

2. Related Art

A semiconductor device may receive a supply voltage from an external system. The semiconductor device may, however, require an operating voltage having a voltage level that is higher than the voltage level of the supply voltage.

In such cases, stable and reliable voltage generators and systems which may include a plurality of voltage pumps or generators are needed.

BRIEF DESCRIPTION OF THE DRAWINGS

FIG. 10 is an example of a timing diagram to assist in the explanation of operations of a voltage generator system in accordance with an embodiment.

DETAILED DESCRIPTION

Figure 1:
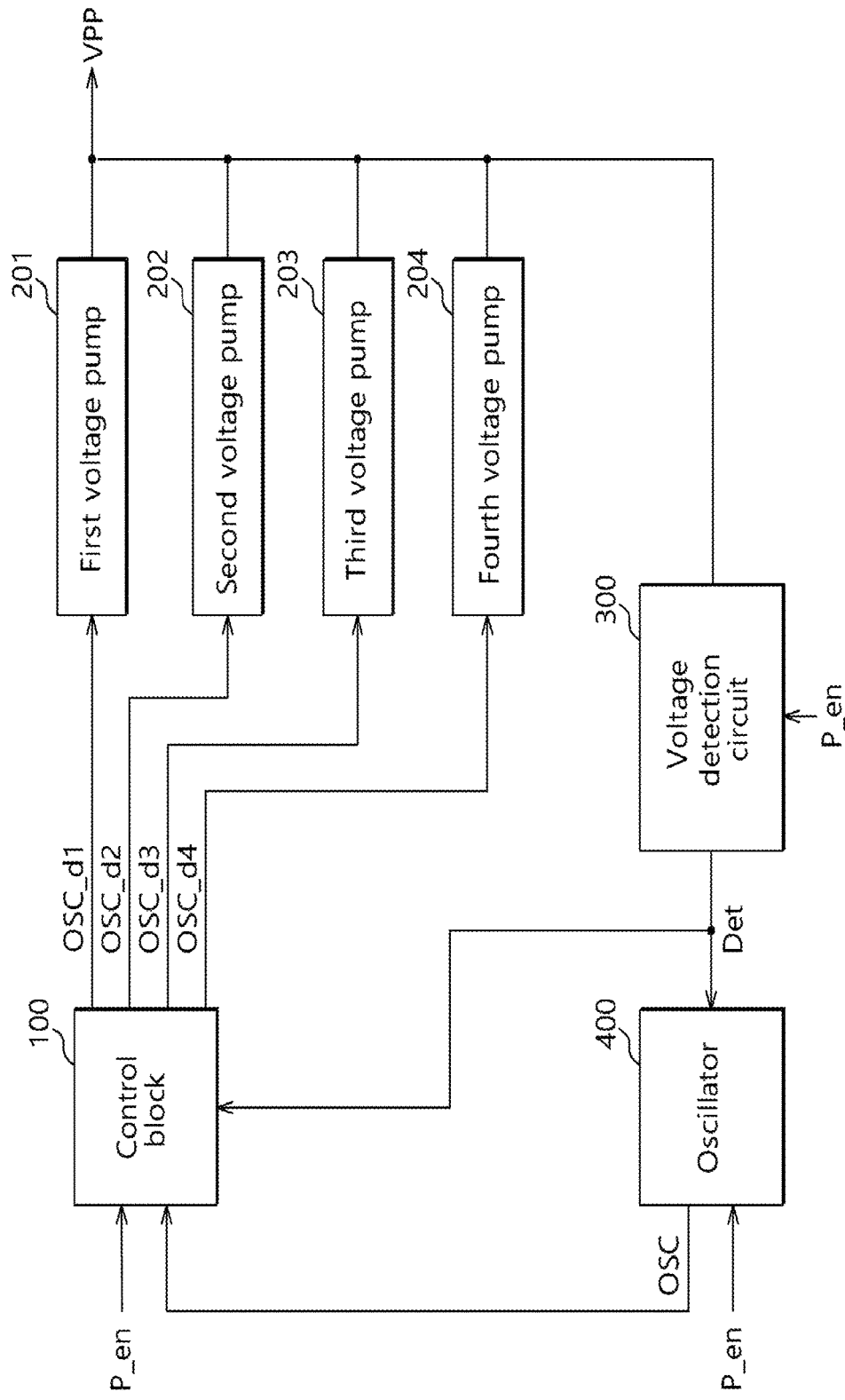
FIG. 1 is a diagram illustrating an example of a voltage generator in accordance with an embodiment.

Voltage generators and systems of the present disclosure are described herein in various embodiments.

In an embodiment, a voltage generator includes a plurality of voltage pumps, a voltage detection circuit, and oscillator, and a control circuit. The plurality of voltage pumps is configured to perform voltage pumping operations in a sequence and output a pumping voltage. The voltage detection circuit is configured to output a detection signal each time the pumping voltage is less than a threshold voltage. The oscillator is configured to generate an oscillator signal. The control circuit is configured to output, in response to each detection signal, a plurality of divided oscillator signals based on the oscillator signal, to enable a different one of the plurality of voltage pumps to begin each sequence of the voltage pumping operations.

In an embodiment, a voltage generator includes a plurality of voltage pumps and a control circuit. The plurality of voltage pumps is configured to perform voltage pumping operations in a sequence and output a pumping voltage. The control circuit is configured to initiate sequences of voltage pumping operations of the voltage pumps in response to a voltage level of the pumping voltage, and to select a different one of the voltage pumps to begin each sequence of the voltage pumping operations of the voltage pumps.

In an embodiment, a voltage generator system includes a plurality of voltage generators, a voltage detection circuit, and a control circuit. The plurality of voltage generators are electrically coupled to an output node, and configured to perform voltage generating operations in a sequence to produce an output voltage at the output node. The voltage detection circuit is configured to output a detection signal based on a voltage level of the output voltage. The control circuit is configured to initiate sequences of voltage generating operations of the voltage generators in response to the detection signal, and to select a different one of the voltage generators to begin each sequence of the voltage generating operations.

In an embodiment, a voltage generator system includes a plurality of voltage pumps, a voltage detection circuit, an oscillator, and a control circuit. The plurality of voltage pumps is configured to perform voltage pumping operations in a sequence and output a pumping voltage. The voltage detection circuit is configured to output a detection signal based on a voltage level of the pumping voltage. The oscillator is configured to generate an oscillator signal. The control circuit is configured to generate a shifting pulse based on the detection signal and the oscillator signal, to enable in a sequence a plurality of select signals each time the shifting pulse is generated, to maintain an enable state of an enabled select signal until the next shifting pulse is inputted, and to output the oscillator signal as a plurality of divided oscillator signals during an enable period of the detection signal according to the sequence of the enabled select signals. The plurality of voltage pumps is configured to perform voltage pumping operations in the sequence in accordance with the plurality of divided oscillator signals.

Hereinafter, voltage generators and systems will be described below with reference to the accompanying drawings in various embodiments.

In FIG. 1, a voltage generator in accordance with an embodiment is shown. The voltage generator may include a control circuit 100, a plurality of voltage pumps, such as first to fourth voltage pumps 201, 202, 203 and 204, a voltage detection circuit 300, and an oscillator 400.

In an embodiment, the control circuit 100 may generate first to fourth divided oscillator signals OCS_d1, OSC_d2, OSC_d3 and OSC_d4, based on or in response to an enable signal P_en, an oscillator signal OSC, and a detection signal Det.

For example, when the enable signal P_en is enabled, the control circuit 100 may recursively output the oscillator signal OSC as the first to fourth divided oscillator signals OCS_d1, OSC_d2, OSC_d3 and OSC_d4, based on or in response to the detection signal Det. In detail, the control circuit 100 may output the oscillator signal OSC sequentially as the first to fourth divided oscillator signals OCS_d1, OSC_d2, OSC_d3 and OSC_d4 during a period in which the detection signal Det is enabled, when the enable signal P_en is enabled. If the detection signal Det is disabled and then enabled, the control circuit 100 may output first a divided oscillator signal next to a divided oscillator signal which is finally outputted when the detection signal Det is disabled. Also, the control circuit 100 may output second the first divided oscillator signal OSC_d1 when the fourth divided oscillator signal OSC_d4 is outputted first.

The first divided oscillator signal OSC_d1 may be input to the first voltage pump 201, which may perform a voltage pumping operation based on or in response to the first divided oscillator signal OSC_d1. The second divided oscillator signal OSC_d2 may be input to the second voltage pump 202, which may perform a voltage pumping operation based on or in response to the second divided oscillator signal OSC_d2. The third divided oscillator signal OSC_d3 may be input to the third voltage pump 203, which may perform a voltage pumping operation based on or in response to the third divided oscillator signal OSC_d3. The fourth divided oscillator signal OSC_d4 may be input to the fourth voltage pump 204, which may perform a voltage pumping operation based on or in response to the fourth divided oscillator signal OSC_d4. A pumping voltage VPP is outputted from a node to which the output terminals of the first to fourth voltage pumps 201, 202, 203 and 204 are electrically coupled in common.

When the enable signal P_en is enabled, the voltage detection circuit 300 may generate the detection signal Det based on or in response to the voltage level of the pumping voltage VPP. For example, when the enable signal P_en is enabled, the voltage detection circuit 300 may enable the detection signal Det if the voltage level of the pumping voltage VPP is lower than a threshold voltage. Further, the voltage detection circuit 300 may disable the detection signal Det if the voltage level of the pumping voltage VPP is higher than the threshold voltage when the enable signal P_en is enabled. The voltage detection circuit 300 may disable the detection signal Det when the enable signal P_en is disabled.

The oscillator 400 may generate the oscillator signal OSC based on or in response to the enable signal P_en and the detection signal Det. For example, the oscillator 400 may generate the oscillator signal OSC which cyclically transitions, when the enable signal P_en is enabled and the detection signal Det is enabled. The oscillator 400 may fix the oscillator signal OSC to a specified level when even any one of the enable signal P_en and the detection signal Det is disabled.

Figure 2:
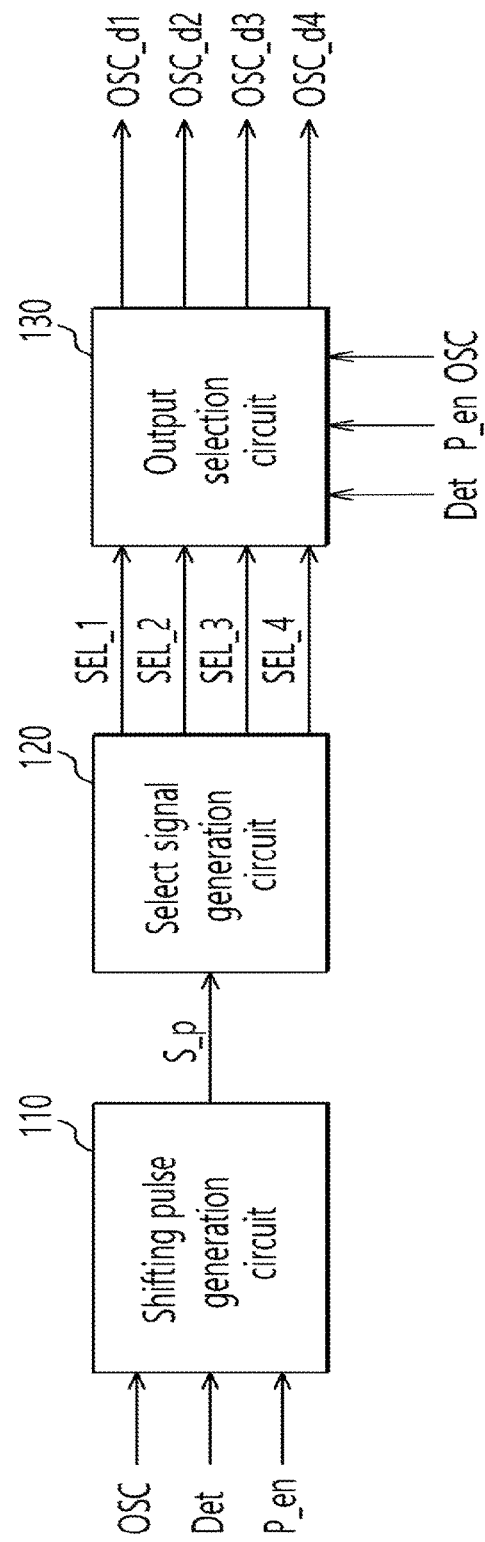
FIG. 2 is a diagram illustrating an example of a control circuit of FIG. 1.

As shown in FIG. 2, the control circuit 100 may include a shifting pulse generation circuit 110, a select signal generation circuit 120, and an output selection circuit 130.

The shifting pulse generation circuit 110 may generate a shifting pulse S_p based on or in response to the oscillator signal OSC, the detection signal Det and the enable signal P_en. For example, the shifting pulse generation circuit 110 may output the shifting pulse S_p which is enabled for a predetermined time, when the detection signal Det is disabled and then enabled in a state in which the enable signal P_en is enabled. Moreover, the shifting pulse generation circuit 110 may output the oscillator signal OSC as the shifting pulse S_p during the enable period of the detection signal Det in the state in which the enable signal P_en is enabled. The shifting pulse generation circuit 110 may fix the shifting pulse S_p to a disable level when the enable signal P_en is disabled.

The select signal generation circuit 120 may generate first to fourth select signals SEL_1, SEL_2, SEL_3 and SEL_4 based on or in response to the shifting pulse S_p. For example, the select signal generation circuit 120 may recursively enable the first to fourth select signals SEL_1, SEL_2, SEL_3 and SEL_4 for a preset time each time the shifting pulse S_p is inputted. The select signal generation circuit 120 may enable the first select signal SEL_1 after the fourth select signal SEL_4 is enabled and then disabled.

The output selection circuit 130 may generate the first to fourth divided oscillator signals OCS_d1, OSC_d2, OSC_d3 and OSC_d4 based on or in response to the enable signal P_en, the detection signal Det, the oscillator signal OSC and the first to fourth select signals SEL_1, SEL_2, SEL_3 and SEL_4. For example, the output selection circuit 130 may output the oscillator signal OSC as the first to fourth divided oscillator signals OCS_d1, OSC_d2, OSC_d3 and OSC_d4 according to the order in which the first to fourth select signals SEL_1, SEL_2, SEL_3 and SEL_4 are enabled during the enable period of the detection signal Det, when the enable signal P_en is enabled.

Figure 3:
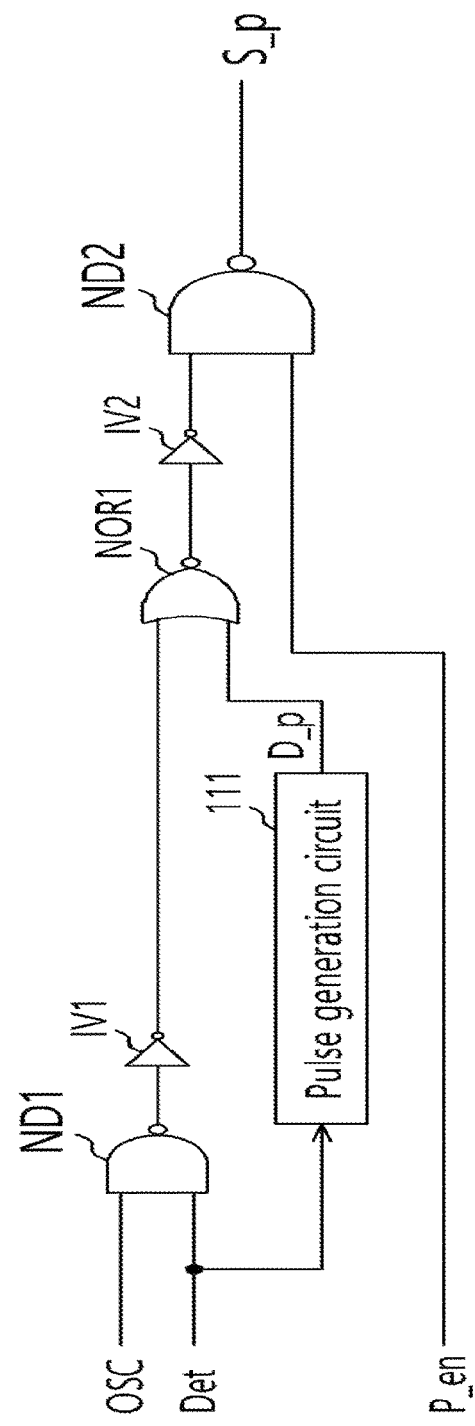
FIG. 3 is a diagram illustrating an example of a shifting pulse generation circuit of FIG. 2.

As shown in FIG. 3, the shifting pulse generation circuit 110 may include a pulse generation circuit 111, first and second NAND gates ND1 and ND2, first and second inverters IV1 and IV2, and a NOR gate NOR1. The pulse generation circuit 111 may generate a detection pulse D_p based on or in response to the detection signal Det. For example, the pulse generation circuit 111 may generate the detection pulse D_p which is enabled for a preselected time, when the detection signal Det is enabled. The first NAND gate ND1 may be inputted with the oscillator signal OSC and the detection signal Det. The first inverter IV1 may be inputted with the output signal of the first NAND gate ND1. The NOR gate NOR1 may be inputted with the detection pulse D_p and the output signal of the first inverter IV1. The second inverter IV2 may be inputted with the output signal of the NOR gate NOR1. The second NAND gate ND2 may be inputted with the enable signal P_en and the output signal of the second inverter IV2, and outputs the shifting pulse S_p.

Operations of the shifting pulse generation circuit 110 configured as described above will be described below.

The pulse generation circuit 111 may generate the detection pulse D_p if the detection signal Det is disabled and then enabled.

The first NAND gate ND1 and the first inverter IV1 may output the oscillator signal OSC during the enable period of the detection signal Det.

The NOR gate NOR1 and the second inverter IV2 may output the oscillator signal OSC or the detection pulse D_p which is outputted during the enable period of the detection signal Det.

The second NAND gate ND2 may invert the output signal of the second inverter IV2 and output the shifting pulse S_p while the enable signal P_en is enabled. That is to say, the second NAND gate ND2 may invert the detection pulse D_p and output the shifting pulse S_p while the enable signal P_en is enabled, or may output the oscillator signal OSC as the shifting pulse S_p during a period in which both the enable signal P_en and the detection signal Det are enabled.

As a result, the shifting pulse generation circuit 110 may output the shifting pulse S_p if the detection signal Det is enabled during a period in which the enable signal P_en is enabled, and may output the oscillator signal OSC as the shifting pulse S_p during the period in which both the enable signal P_en and the detection signal Det are enabled.

Figure 4:
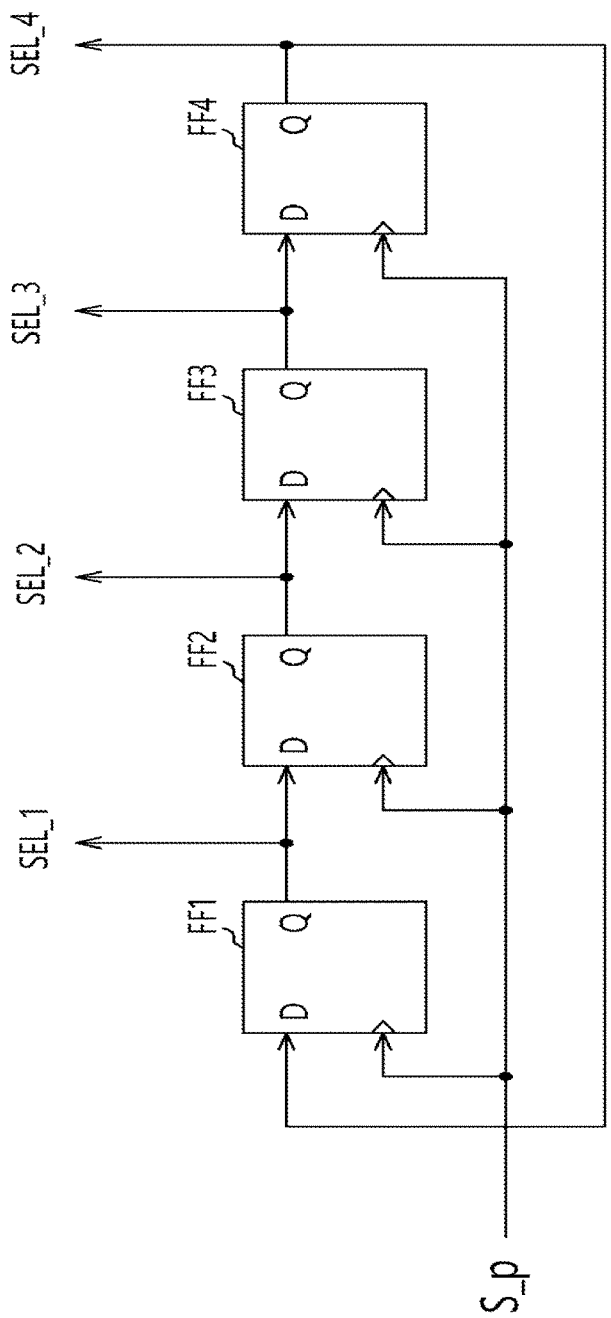
FIG. 4 is a diagram illustrating an example of a select signal generation circuit of FIG. 2.

As shown in FIG. 4, the select signal generation circuit 120 may include first to fourth flip-flops FF1, FF2, FF3 and FF4 which are electrically coupled in a ring structure. The first flip-flop FF1 may be inputted with the output signal of the fourth flip-flop FF4 through a signal input terminal and is inputted with the shifting pulse S_p through a clock input terminal. The second flip-flop FF2 may be inputted with the output signal of the first flip-flop FF1 through a signal input terminal and may be inputted with the shifting pulse S_p through a clock input terminal. The third flip-flop FF3 may be inputted with the output signal of the second flip-flop FF2 through a signal input terminal, and may be inputted with the shifting pulse S_p through a clock input terminal. The fourth flip-flop FF4 may be inputted with the output signal of the third flip-flop FF3 through a signal input terminal, and may be inputted with the shifting pulse S_p through a clock input terminal. Among the first to fourth flip-flops FF1, FF2, FF3 and FF4, only the first flip-flop FF1 may have a high level as an initial value, and the remaining flip-flops FF2, FF3 and FF4 may have a low level as an initial value. The output signal of the first flip-flop FF1 may be outputted as the first select signal SEL_1, the output signal of the second flip-flop FF2 may be outputted as the second select signal SEL_2, the output signal of the third flip-flop FF3 may be outputted as the third select signal SEL_3, and the output signal of the fourth flip-flop FF4 is outputted as the fourth select signal SEL_4.

The select signal generation circuit 120 may be configured as described above, may transfer the output signal of each flip-flop to a next flip-flop each time the shifting pulse S_p is inputted or enabled.

The above-described operations of the select signal generation circuit 120 may be represented in Table 1 as follows.

TABLE 1

Example of Operations of A Select Signal Generation Circuit.

| First flip-flop | Second flip-flop | Third flip-flop | Fourth flip-flop |
| --- | --- | --- | --- |
| High | Low | Low | Low |
| Low | High | Low | Low |
| Low | Low | High | Low |
| Low | Low | Low | High |
| High | Low | Low | Low |

Figure 5:
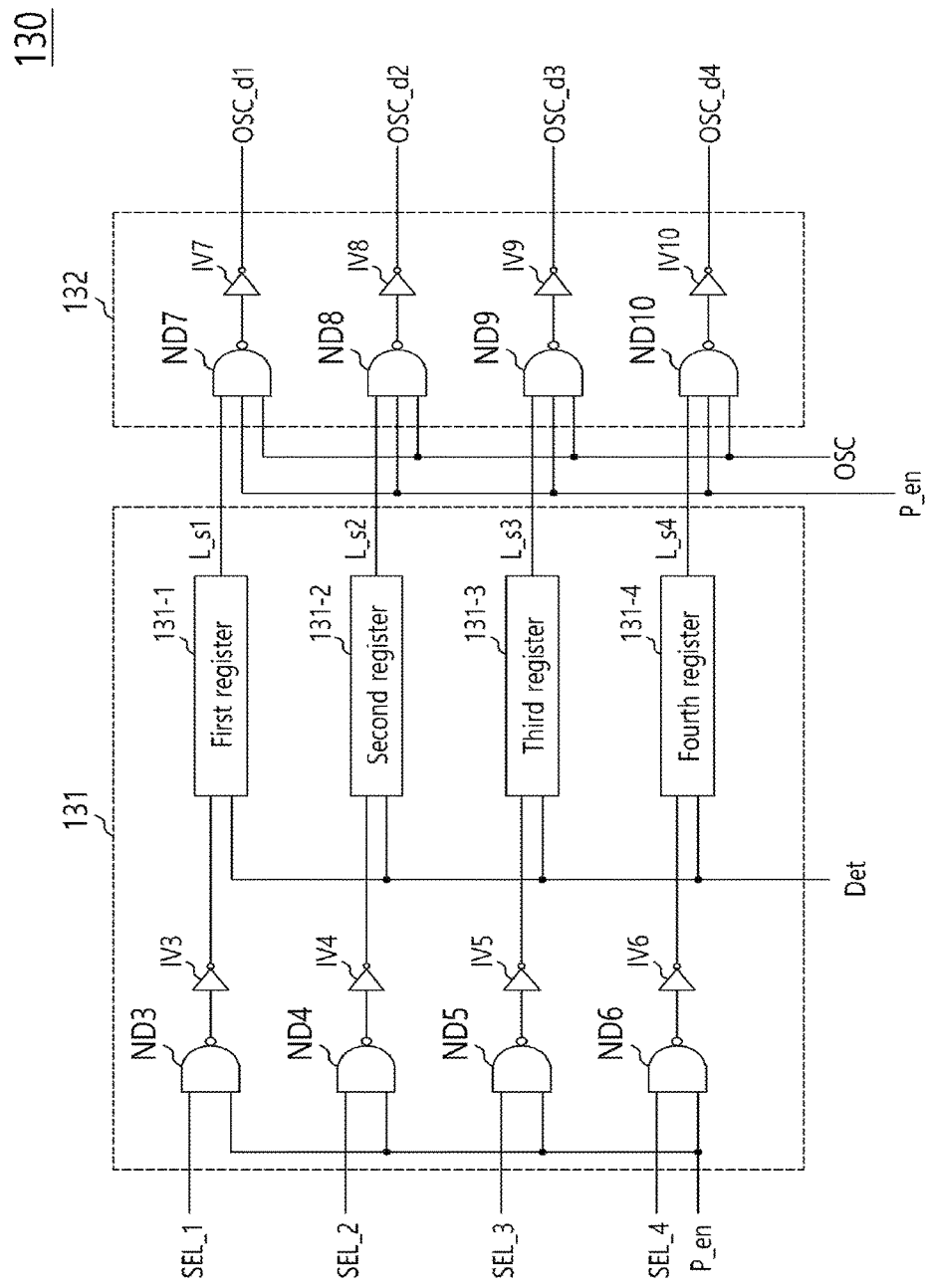
FIG. 5 is a diagram illustrating an example of an output selection circuit of FIG. 2.

As shown in FIG. 5, the output selection circuit 130 may include a latch select signal generation circuit 131 and a divided oscillator signal output circuit 132.

The latch select signal generation circuit 131 may generate first to fourth latch select signals L_s1, L_s2, L_s3 and L_s4 based on or in response to the first to fourth select signals SEL_1, SEL_2, SEL_3 and SEL_4, the detection signal Det, and the enable signal P_en.

For example, the latch select signal generation circuit 131 may enable the first to fourth latch select signals L_s1, L_s2, L_s3 and L_s4 based on or in response to the first to fourth select signals SEL_1, SEL_2, SEL_3 and SEL_4 during the period in which the detection signal Det is enabled. Also, the latch select signal generation circuit 131 may disable the first to fourth latch select signals L_s1, L_s2, L_s3 and L_s4 when the detection signal Det is disabled.

In detail, the latch select signal generation circuit 131 may enable the corresponding first to fourth latch select signals L_s1, L_s2, L_s3 and L_s4 when the first to fourth select signals SEL_1, SEL_2, SEL_3 and SEL_4 are enabled during the period in which the enable signal P_en and the detection signal Det are enabled. Also, the latch select signal generation circuit 131 may disable the first to fourth latch select signals L_s1, L_s2, L_s3 and L_s4 when the detection signal Det is disabled. If the first select signal SEL_1 is enabled in the case where the enable signal P_en is enabled and the detection signal Det is enabled, the latch select signal generation circuit 131 may enable the first latch select signal L_s1 until the detection signal Det may be disabled. If the second select signal SEL_2 is enabled in the case where the enable signal P_en is enabled and the detection signal Det is enabled, the latch select signal generation circuit 131 may enable the second latch select signal L_s2 until the detection signal Det is disabled. If the third select signal SEL_3 is enabled in the case where the enable signal P_en may be enabled and the detection signal Det may be enabled, the latch select signal generation circuit 131 may enable the third latch select signal L_s3 until the detection signal Det is disabled. If the fourth select signal SEL_4 is enabled in the case where the enable signal P_en is enabled and the detection signal Det is enabled, the latch select signal generation circuit 131 may enable the fourth latch select signal L_s4 until the detection signal Det is disabled.

The latch select signal generation circuit 131 may include third to sixth NAND gates ND3, ND4, ND5 and ND6, third to sixth inverters IV3, IV4, IV5 and IV6, and first to fourth registers 131-1, 131-2, 131-3 and 131-4. The third NAND gate ND3 may be inputted with the first select signal SEL_1 and the enable signal P_en. The fourth NAND gate ND4 may be inputted with the second select signal SEL_2 and the enable signal P_en. The fifth NAND gate ND5 may be inputted with the third select signal SEL_3 and the enable signal P_en. The sixth NAND gate ND6 may be inputted with the fourth select signal SEL_4 and the enable signal P_en. The third inverter IV3 may be inputted with the output signal of the third NAND gate ND3. The fourth inverter IV4 may be inputted with the output signal of the fourth NAND gate ND4. The fifth inverter IV5 may be inputted with the output signal of the fifth NAND gate ND5. The sixth inverter IV6 may be inputted with the output signal of the sixth NAND gate ND6. The first register 131-1 may latch the output signal of the third inverter IV3 at the time when the detection signal Det is enabled and outputs the first latch select signal L_s1, and initializes, that is, disables, the first latch select signal L_s1 when the detection signal Det is disabled. The second register 131-2 may latch the output signal of the fourth inverter IV4 at the time when the detection signal Det is enabled and outputs the second latch select signal L_s2, and initializes, that is, disables, the second latch select signal L_s2 when the detection signal Det is disabled. The third register 131-3 may latch the output signal of the fifth inverter IV5 at the time when the detection signal Det is enabled and outputs the third latch select signal L_s3, and initializes, that is, disables, the third latch select signal L_s3 when the detection signal Det is disabled. The fourth register 131-4 may latch the output signal of the sixth inverter IV6 at the time when the detection signal Det is enabled and may output the fourth latch select signal L_s4, and initializes, that is, disables, the fourth latch select signal L_s4 when the detection signal Det is disabled.

The divided oscillator signal output circuit 132 may output the oscillator signal OSC as the first to fourth divided oscillator signals OCS_d1, OSC_d2, OSC_d3 and OSC_d4 during periods in which the first to fourth latch select signals L_s1, L_s2, L_s3 and L_s4 are enabled, when the enable signal P_en is enabled. For example, the divided oscillator signal output circuit 132 may output the oscillator signal OSC as the first divided oscillator signal OCS_d1 during the enable period of the first latch select signal L_s1, when the enable signal P_en is enabled. The divided oscillator signal output circuit 132 may output the oscillator signal OSC as the second divided oscillator signal OCS_d2 during the enable period of the second latch select signal L_s2, when the enable signal P_en is enabled. The divided oscillator signal output circuit 132 may output the oscillator signal OSC as the third divided oscillator signal OCS_d3 during the enable period of the third latch select signal L_s3, when the enable signal P_en is enabled. The divided oscillator signal output circuit 132 may output the oscillator signal OSC as the fourth divided oscillator signal OCS_d4 during the enable period of the fourth latch select signal L_s4, when the enable signal P_en is enabled.

The divided oscillator signal output circuit 132 may include seventh to tenth NAND gates ND7, ND8, ND9 and ND10, and seventh to tenth inverters IV7, IV8, IV9 and IV10. The seventh NAND gate ND7 may be inputted with the first latch select signal L_s1, the enable signal P_en and the oscillator signal OSC. The seventh inverter IV7 may be inputted with the output signal of the seventh NAND gate ND7, and outputs the first divided oscillator signal OSC_d1. The eighth NAND gate ND8 may be inputted with the second latch select signal L_s2, the enable signal P_en and the oscillator signal OSC. The eighth inverter IV8 may be inputted with the output signal of the eighth NAND gate ND8, and outputs the second divided oscillator signal OSC_d2. The ninth NAND gate ND9 may be inputted with the third latch select signal L_s3, the enable signal P_en and the oscillator signal OSC. The ninth inverter IV9 may be inputted with the output signal of the ninth NAND gate ND9, and outputs the third divided oscillator signal OSC_d3. The tenth NAND gate ND10 may be inputted with the fourth latch select signal L_s4, the enable signal P_en and the oscillator signal OSC. The tenth inverter IV10 may be inputted with the output signal of the tenth NAND gate ND10, and outputs the fourth divided oscillator signal OSC_d4.

Operations of the voltage generator in accordance with the embodiment, configured as described above, will be described in more detail below.

The voltage detection circuit 300 may describe the voltage level of the pumping voltage VPP when the enable signal P_en is enabled, and may generate the detection signal Det. For example, the voltage detection circuit 300 may enable the detection signal Det if the voltage level of the pumping voltage VPP is lower than the threshold voltage in the case where the enable signal P_en is enabled.

The oscillator 400 may generate the oscillator signal OSC which cyclically transitions, when the detection signal Det is enabled. The oscillator 400 may fix the oscillator signal OSC to the specified level when the detection signal Det is disabled.

The control circuit 100 may output the oscillator signal OSC selectively as the first to fourth divided oscillator signals OCS_d1, OCS_d2, OCS_d3 and OSC_d4 based on or in response to the detection signal Det when the enable signal P_en is enabled.

The operations of the control circuit 100 will be described below in detail.

As shown in FIG. 2, the control circuit 100 may include the shifting pulse generation circuit 110, the select signal generation circuit 120, and the output selection circuit 130.

The shifting pulse generation circuit 110 may generate a pulse when the detection signal Det is disabled and then enabled in the state in which the enable signal P_en is enabled, and may output the generated pulse as the shifting pulse S_p. Moreover, the shifting pulse generation circuit 110 may output the oscillator signal OSC as the shifting pulse S_p during the enable period of the detection signal Det when the enable signal P_en is enabled.

The select signal generation circuit 120 may sequentially enable, one-by-one, the first to fourth select signals SEL_1, SEL_2, SEL_3 and SEL_4 based on or in response to the shifting pulse S_p. In this regard, after the fourth select signal SEL_4 is enabled, the first select signal SEL_1 may be enabled. In detail, the select signal generation circuit 120 may enable the first select signal SEL_1 while the shifting pulse S_p is first enabled and then disabled. The select signal generation circuit 120 may disable the first select signal SEL_1 and enables the second select signal SEL_2 while the shifting pulse S_p is second enabled and then disabled. The select signal generation circuit 120 may disable the second select signal SEL_2 and enables the third select signal SEL_3 while the shifting pulse S_p is third enabled and then disabled. The select signal generation circuit 120 may disable the third select signal SEL_3 and enables the fourth select signal SEL_4 while the shifting pulse S_p is fourth enabled and then disabled. The select signal generation circuit 120 may disable the fourth select signal SEL_4 and enables the first select signal SEL_1 while the shifting pulse S_p is fifth enabled and then disabled.

The output selection circuit 130 may output the oscillator signal OSC selectively as the first to fourth divided oscillator signals OCS_d1, OSC_d2, OSC_d3 and OSC_d4 based on or in response to the first to fourth select signals SEL_1, SEL_2, SEL_3 and SEL_4 when the enable signal P_en is enabled and the detection signal Det is enabled. For example, the output selection circuit 130 may output the oscillator signal OSC as the first divided oscillator signal OCS_d1 until the detection signal Det is disabled, when the enable signal P_en, the detection signal Det and the first select signal SEL_1 are enabled. The output selection circuit 130 may output the oscillator signal OSC as the second divided oscillator signal OCS_d2 until the detection signal Det is disabled, when the enable signal P_en, the detection signal Det and the second select signal SEL_2 are enabled. The output selection circuit 130 may output the oscillator signal OSC as the third divided oscillator signal OCS_d3 until the detection signal Det is disabled, when the enable signal P_en, the detection signal Det and the third select signal SEL_3 are enabled. The output selection circuit 130 may output the oscillator signal OSC as the fourth divided oscillator signal OCS_d4 until the detection signal Det is disabled, when the enable signal P_en, the detection signal Det and the fourth select signal SEL_4 are enabled.

The first to fourth voltage pumps 201, 202, 203 and 204, which may be inputted with the first to fourth divided oscillator signals OCS_d1, OSC_d2, OSC_d3 and OSC_d4, may perform voltage pumping operations and generate the pumping voltage VPP.

If the detection signal Det is disabled after only the first and second voltage pumps 201 and 202 among the first to fourth voltage pumps 201, 202, 203 and 204 perform voltage pumping operations, a voltage pumping operation may be performed from the third voltage pump 203 when the detection signal Det is enabled again. In other words, from a voltage pump next to a voltage pump which has finally performed a voltage pumping operation when the detection signal Det is disabled, the voltage pumping operation may be performed when the detection signal Det is enabled again.

Figure 6:
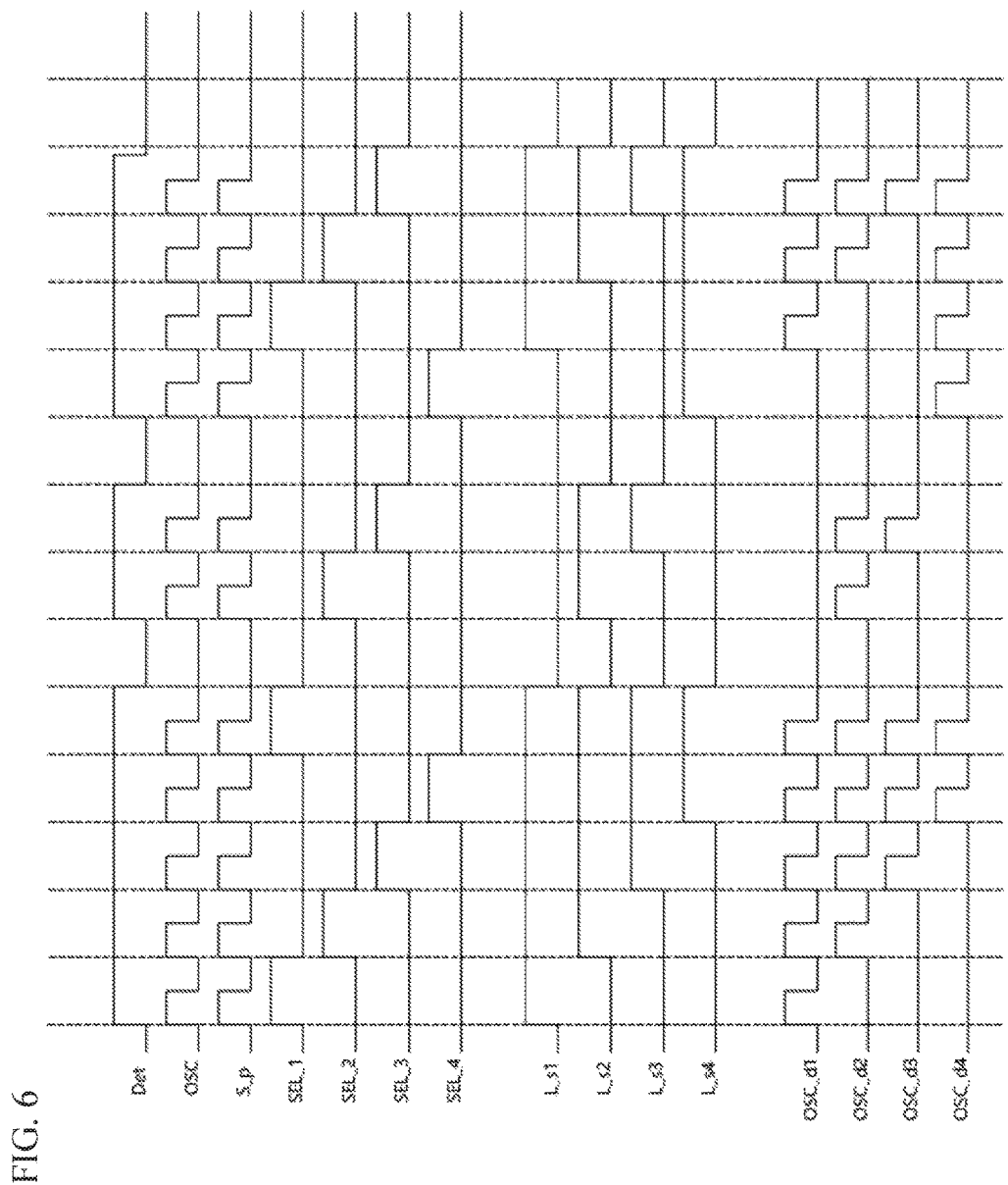
FIG. 6 is an example of a timing diagram to assist in the explanation of operations of a voltage generator in accordance with an embodiment.

The above-described operations will be described below in more detail with reference to FIG. 6.

The oscillator signal OSC may be generated during the period in which the detection signal Det is enabled.

The pulse generated when the detection signal Det is enabled may be outputted as the shifting pulse S_p, or the oscillator signal OSC may be outputted as the shifting pulse S_p. In FIG. 6, it may be assumed that the oscillator signal OSC and the shifting pulse S_p are generated to be the same.

Each time the shifting pulse S_p is inputted, the first to fourth select signals SEL_1, SEL_2, SEL_3 and SEL_4 may be enabled, one-by-one, in a sequence.

While the detection signal Det is enabled first and then disabled, the shifting pulse S_p may be enabled 5 times. Therefore, the first to fourth select signals SEL_1, SEL_2, SEL_3 and SEL_4 may be enabled respectively one (1) time starting from the first select signal SEL_1, and the first select signal SEL_1 may be enabled by the fifth shifting pulse S_p. In this state, the detection signal Det may be disabled.

Based on or in response to the first to fourth select signals SEL_1, SEL_2, SEL_3 and SEL_4, the first to fourth latch select signals L_s1, L_s2, L_s3 and L_s4 may be enabled until the detection signal Det is disabled. During the respective enable periods of the first to fourth latch select signals L_s1, L_s2, L_s3 and L_s4, the oscillator signal OSC may be outputted as the first to fourth divided oscillator signals OCS_d1, OSC_d2, OSC_d3 and OSC_d4.

The first to fourth voltage pumps 201, 202, 203 and 204 may be inputted with the first to fourth divided oscillator signals OCS_d1, OSC_d2, OSC_d3 and OSC_d4, respectively, and may generate the pumping voltage VPP.

While the detection signal Det is enabled second and then disabled, the shifting pulse S_p may be enabled 2 times. By the shifting pulse S_p which is enabled 2 times, the second select signal SEL_2 may be enabled first, and the third select signal SEL_3 may be enabled last. The reason the second select signal SEL_2 may be enabled first is that as the first select signal SEL_1 is enabled last while the detection signal Det is enabled first and then disabled, the second select signal SEL_2 is enabled first when the detection signal Det is enabled second.

Accordingly, while the detection signal Det is enabled second and then disabled, the second and third latch select signals L_s2 and L_s3 may be enabled. During the periods in which the second and third latch select signals L_s2 and L_s3 are enabled, the oscillator signal OSC may be outputted as the second and third divided oscillator signals OSC_d2 and OSC_d3, and the second and third voltage pumps 202 and 203 may perform voltage pumping operations and generate the pumping voltage VPP. When the detection signal Det is enabled second, the second voltage pump 202 may perform first a voltage pumping operation.

While the detection signal Det is enabled third and then disabled, the shifting pulse S_p may be enabled 4 times. By the shifting pulse S_p which may be enabled 4 times, the fourth select signal SEL_4 may be enabled first, and then the first to third select signals SEL_1, SEL_2 and SEL_3 may be sequentially enabled. The reason the fourth select signal SEL_4 may be enabled first is that the third select signal SEL_3 is enabled last while the detection signal Det is enabled second and then disabled.

Accordingly, while the detection signal Det is enabled third and then disabled, the fourth, first, second and third latch select signals L_s4, L_s1, L_s2 and L_s3 may be enabled sequentially. During the periods in which the first to fourth latch select signals L_s1, L_s2, L_s3 and L_s4 are enabled, the oscillator signal OSC may be outputted as the first to fourth divided oscillator signals OCS_d1, OSC_d2, OSC_d3 and OSC_d4, and the first to fourth voltage pumps 201, 202, 203 and 203 may perform voltage pumping operations and generate the pumping voltage VPP. When the detection signal Det is enabled third, the fourth voltage pump 204 may perform first a voltage pumping operation.

As a result, the first voltage pump 201 may start a voltage pumping operation when the detection signal Det is enabled first, the second voltage pump 202 may start a voltage pumping operation when the detection signal Det is enabled second, and the fourth voltage pump 204 may start a voltage pumping operation when the detection signal Det is enabled third.

In the voltage generator in accordance with the embodiment, voltage pumps are enabled in a sequence to perform voltage pumping operations and generate a pumping voltage. If the pumping voltage is higher than a threshold voltage, voltage pumping operations of the voltage pumps are interrupted or terminated. If the pumping voltage is lower than the threshold voltage, the voltage pumps perform voltage pumping operations in a sequence and generate the pumping voltage. When the voltage pumps perform again voltage pumping operations in a sequence, the voltage pump that is selected to begin the sequence may vary. The control circuit 100 may select the voltage pump that begins the sequence by selecting one of a plurality of divided oscillator signals to be outputted first.

Without such a technique, the same voltage pump is always selected to begin the sequence of voltage pumping operations. Thus, a pumping voltage may have always been applied to an output node even though the other voltage pumps do not perform voltage pumping operations. As a result, transistors of a voltage pump which is always applied with a pumping voltage even though it does not perform a voltage pumping operation may be exposed to a large amount of stress and be easily degraded.

Each time the voltage pumps are enabled to perform voltage pumping operations, the voltage pump that is selected to begin the sequence of voltage pumping operations is changed. Thus, it is possible to reduce the possibility or prevent any particular voltage pump from being degraded. A voltage generator in accordance with an embodiment may thereby operate more stably. According to an embodiment, a plurality of divided oscillator signals may be generated and provided to the voltage pumps.

Figure 7:
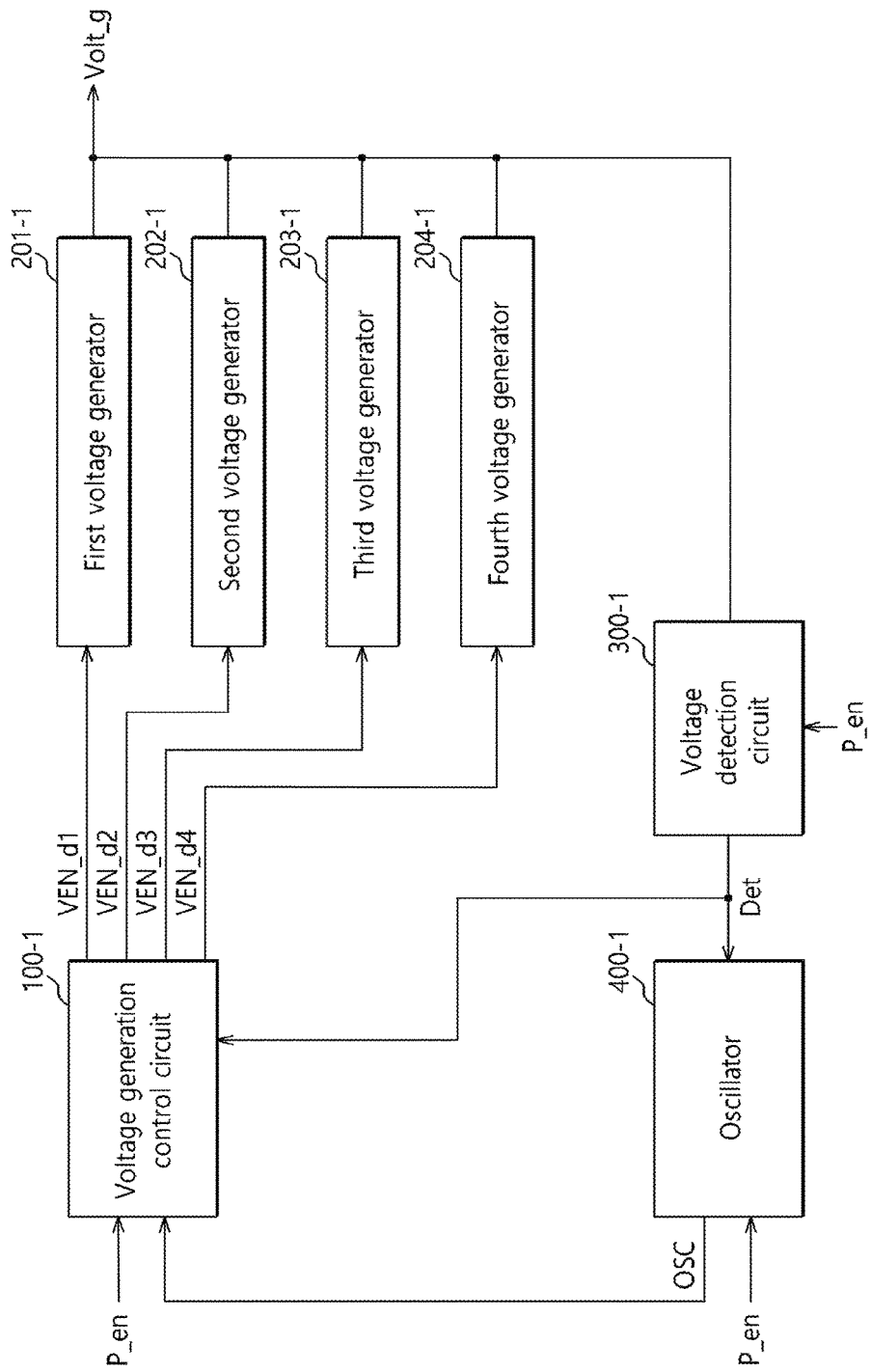
FIG. 7 is a diagram illustrating an example of a voltage generator system in accordance with an embodiment.

Referring now to FIG. 7, a voltage generator system in accordance with an embodiment is shown. The voltage generator system may include a voltage generator control circuit 100-1, a plurality of voltage generators, such as first to fourth voltage generators 201-1, 202-1, 203-1 and 204-1, a voltage detection circuit 300-1, and an oscillator 400-1.

The voltage generator control circuit 100-1 may generate first to fourth enable signals VEN_d1, VEN_d2, VEN_d3 and VEN_d4, based on or in response to a detection signal Det and an oscillator signal OSC, such that one of a plurality of voltage generators which generates first a voltage may be selected.

The first voltage generator 201-1 may perform an operation of generating a voltage Volt_g, when the first enable signal VEN_d1 is enabled.

The second voltage generator 202-1 may perform an operation of generating the voltage Volt_g, when the second enable signal VEN_d2 is enabled.

The third voltage generator 203-1 may perform an operation of generating the voltage Volt_g, when the third enable signal VEN_d3 is enabled.

The fourth voltage generator 204-1 may perform an operation of generating the voltage Volt_g, when the fourth enable signal VEN_d4 is enabled. The respective output nodes of the first to fourth voltage generators 201-1, 202-1, 203-1 and 204-1 are electrically coupled in common.

The voltage detection circuit 300-1 may detect the voltage level of the voltage Volt_g which is generated by the first to fourth voltage generators 201-1, 202-1, 203-1 and 204-1, and may generate the detection signal Det. For example, the voltage detection circuit 300-1 may enable the detection signal Det when the voltage Volt_g is lower than a threshold voltage.

The oscillator 400-1 may generate the oscillator signal OSC based on or in response to the detection signal Det. For example, the oscillator 400-1 may generate the oscillator signal OSC which cyclically transitions during a period in which the detection signal Det is enabled, and fixes the oscillator signal OSC to a specified level when the detection signal Det is disabled.

Figure 8:
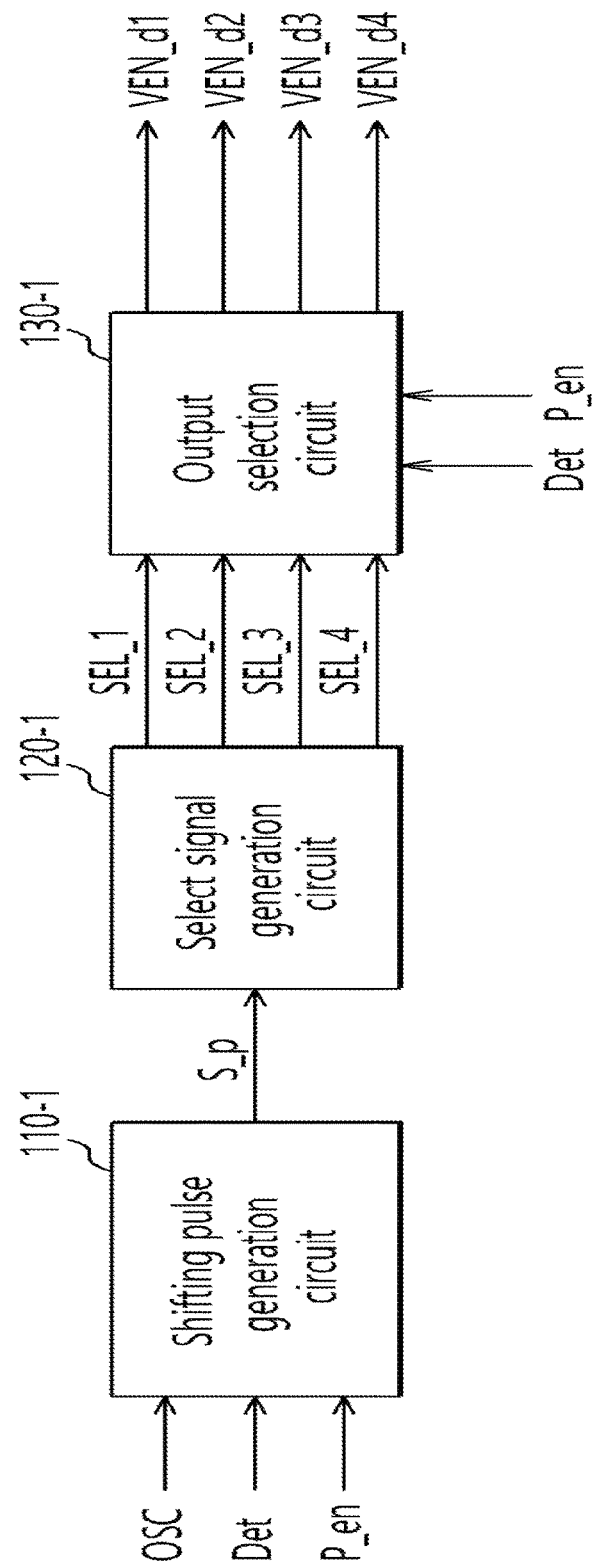
FIG. 8 is a diagram illustrating an example of a voltage generator control circuit of FIG. 7.

As shown in FIG. 8, the control circuit 100-1 may include a shifting pulse generation circuit 110-1, a select signal generation circuit 120-1, and an output selection circuit 130-1.

The shifting pulse generation circuit 110-1 may generate a shifting pulse S_p based on or in response to the detection signal Det and the oscillator signal OSC. For example, the shifting pulse generation circuit 110-1 may output the oscillator signal OSC as the shifting pulse S_p during the period in which the detection signal Det is enabled. On the other hand, the shifting pulse generation circuit 110-1 may generate a pulse when the detection signal Det is enabled and may output the generated pulse as the shifting pulse S_p. The shifting pulse generation circuit 110-1 may be configured as shown in FIG. 3, and thus, the description of the configuration shown in FIG. 3 will replace the description of the shifting pulse generation circuit 110-1.

The select signal generation circuit 120-1 may sequentially enable, one-by-one, first to fourth select signals SEL_1, SEL_2, SEL_3 and SEL_4 each time the shifting pulse S_p is inputted. A select signal, which may be enabled by the shifting pulse S_p, may maintain the enable state until a next shifting pulse S_p is inputted. As shown in FIG. 4, the select signal generation circuit 120-1 may include first to fourth flip-flops FF1, FF2, FF3 and FF4 which are electrically coupled in a ring structure. The flip-flops FF1, FF2, FF3 and FF4 may output the first to fourth select signals SEL_1, SEL_2, SEL_3 and SEL_4, respectively.

The output selection circuit 130-1 may enable the respective first to fourth enable signals VEN_d1, VEN_d2, VEN_d3 and VEN_d4 based on or in response to the respective first to fourth select signals SEL_1, SEL_2, SEL_3 and SEL_4 when the detection signal Det is enabled, and disables the first to fourth enable signals VEN_d1, VEN_d2, VEN_d3 and VEN_d4 when the detection signal Det is disabled.

Figure 9:
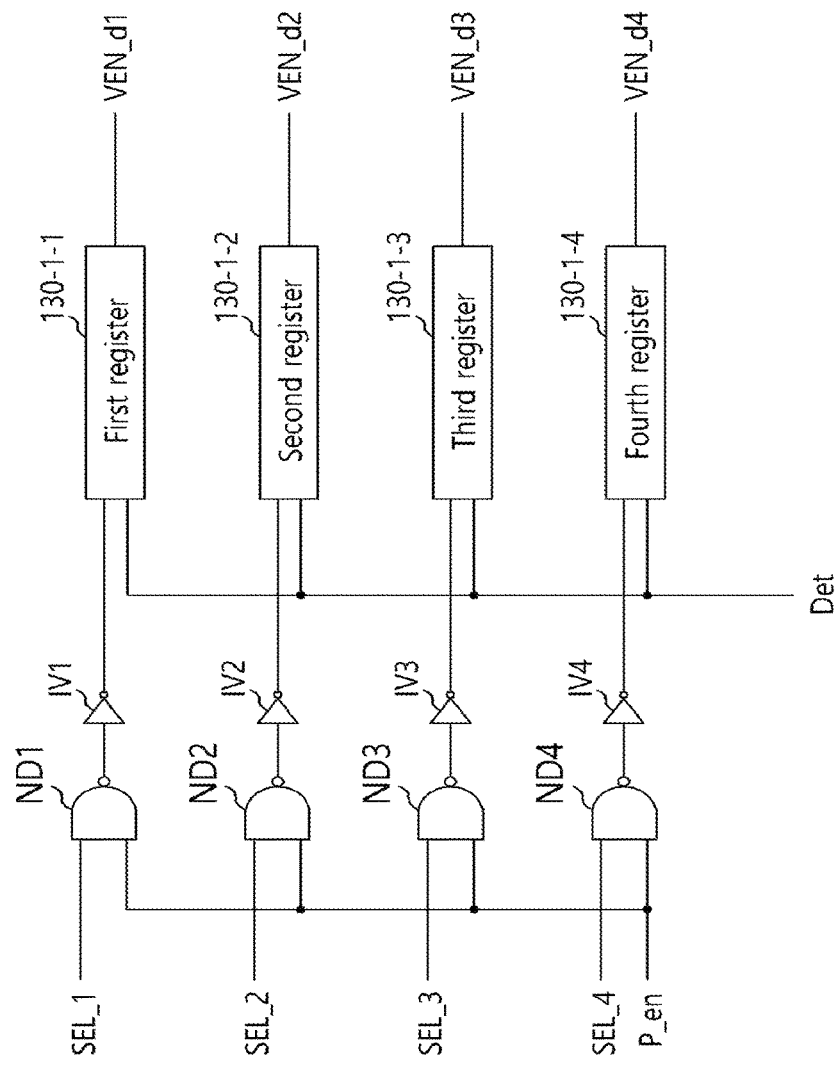
FIG. 9 is a diagram illustrating an example of the output selection circuit of FIG. 8.

As shown in FIG. 9, the output selection circuit 130-1 may include first to fourth NAND gates ND1, ND2, ND3 and ND4, first to fourth inverters IV1, IV2, IV3 and IV4, and first to fourth registers 130-1-1, 130-1-2, 130-1-3 and 130-1-4. The first NAND gate ND1 may be inputted with the first select signal SEL_1 and a enable signal P_en. The second NAND gate ND2 may be inputted with the second select signal SEL_2 and the enable signal P_en. The third NAND gate ND3 may be inputted with the third select signal SEL_3 and the enable signal P_en. The fourth NAND gate ND4 may be inputted with the fourth select signal SEL_4 and the enable signal P_en.

The first inverter IV1 may be inputted with the output signal of the first NAND gate ND1. The second inverter IV2 may be inputted with the output signal of the second NAND gate ND2. The third inverter IV3 may be inputted with the output signal of the third NAND gate ND3. The fourth inverter IV4 may be inputted with the output signal of the fourth NAND gate ND4. The first latch 130-1-1 may enable the first enable signal VEN_d1 when the first select signal SEL_1 may be enabled in the state in which the detection signal Det is enabled, and maintains the enabled first enable signal VEN_d1 until the detection signal Det is disabled. The second register 130-1-2 may enable the second enable signal VEN_d2 when the second select signal SEL_2 is enabled in the state in which the detection signal Det is enabled. The second register 130-1-2 may maintain the enabled second enable signal VEN_d2 until the detection signal Det is disabled. The third register 130-1-3 may enable the third enable signal VEN_d3 when the third select signal SEL_3 is enabled in the state in which the detection signal Det is enabled. The third register 130-1-3 may maintain the enabled third enable signal VEN_d3 until the detection signal Det is disabled. The fourth register 130-1-4 may enable the fourth enable signal VEN_d4 when the fourth select signal SEL_4 is enabled in the state in which the detection signal Det is enabled. The fourth register 130-1-4 may maintain the enabled fourth enable signal VEN_d4 until the detection signal Det is disabled.

Operations of a voltage generator system in accordance with an embodiment, which may be configured as described above, will be described in detail below with reference to FIG. 10.

The oscillator signal OSC may be generated during the period in which the detection signal Det is enabled.

The pulse generated when the detection signal Det is enabled may be outputted as the shifting pulse S_p, or the oscillator signal OSC may be outputted as the shifting pulse S_p. In FIG. 10, it may be assumed that the oscillator signal OSC and the shifting pulse S_p are generated to be the same.

Each time the shifting pulse S_p is inputted, the first to fourth select signals SEL_1, SEL_2, SEL_3 and SEL_4 may be sequentially enabled one-by-one.

While the detection signal Det is enabled first and then disabled, the shifting pulse S_p may be enabled 5 times. Therefore, the first to fourth select signals SEL_1, SEL_2, SEL_3 and SEL_4 may be enabled respectively one (1) time starting from the first select signal SEL_1. The first select signal SEL_1 may be enabled by the fifth shifting pulse S_p. In this state, the detection signal Det may be disabled.

Based on or in response to the first to fourth select signals SEL_1, SEL_2, SEL_3 and SEL_4, the first to fourth enable signals VEN_d1, VEN_d2, VEN_d3 and VEN_d4 may be enabled until the detection signal Det is disabled. In other words, the first enable signal VEN_d1 may be enabled by the first select signal SEL_1 which is enabled first, and the enabled first enable signal VEN_d1 may be maintained until the detection signal Det is disabled. The second enable signal VEN_d2 may be enabled by the second select signal SEL_2 which is enabled second. The enabled second enable signal VEN_d2 may be maintained until the detection signal Det is disabled. The third enable signal VEN_d3 may be enabled by the third select signal SEL_3 which is enabled third. The enabled third enable signal VEN_d3 may be maintained until the detection signal Det is disabled. The fourth enable signal VEN_d4 may be enabled by the fourth select signal SEL_4 which is enabled fourth. The enabled fourth enable signal VEN_d4 may be maintained until the detection signal Det is disabled.

The respective first to fourth voltage generators 201-1, 202-1, 203-1 and 204-1 may generate the voltage Volt_g during the enable periods of the first to fourth enable signals VEN_d1, VEN_d2, VEN_d3 and VEN_d4.

While the detection signal Det is enabled second and then disabled, the shifting pulse S_p may be enabled 2 times. By the shifting pulse S_p which is enabled 2 times, the second select signal SEL_2 may be enabled first, and the third select signal SEL_3 may be enabled last. The reason the second select signal SEL_2 may be enabled first is that, as the first select signal SEL_1 is enabled last while the detection signal Det is enabled first and then disabled, the second select signal SEL_2 is enabled first when the detection signal Det is enabled second.

Accordingly, while the detection signal Det is enabled second and then disabled, the second and third enable signals VEN_d2 and VEN_d3 may be enabled. The second and third voltage generators 202-1 and 203-1 may generate the voltage Volt_g during the periods in which the second and third enable signals VEN_d2 and VEN_d3 are enabled. When the detection signal Det is enabled second, the second voltage generator 202-1 may perform first a voltage generating operation.

While the detection signal Det is enabled third and then disabled, the shifting pulse S_p may be enabled 4 times. By the shifting pulse S_p which is enabled 4 times, the fourth select signal SEL_4 may be enabled first, and then the first to third select signals SEL_1, SEL_2 and SEL_3 may be sequentially enabled. Here, the fourth select signal SEL_4 may be enabled first because the third select signal SEL_3 is enabled last while the detection signal Det is enabled second and then disabled.

Accordingly, while the detection signal Det is enabled third and then disabled, the fourth, first, second and third enable signals VEN_d4, VEN_d1, VEN_d2 and VEN_d3 may be enabled sequentially. The first to fourth voltage generators 201-1, 202-1, 203-1 and 204-1 may perform voltage generating operations and generate the voltage Volt_g during the periods in which the first to fourth enable signals VEN_d1, VEN_d2, VEN_d3 and VEN_d4 are enabled. When the detection signal Det is enabled third, the fourth voltage generator 204-1 may perform first a voltage generating operation.

As a result, the first voltage generator 201-1 may start a voltage generating operation when the detection signal Det is enabled first, the second voltage generator 202-1 may start a voltage generating operation when the detection signal Det is enabled second, and the fourth voltage generator 204-1 may start a voltage generating operation when the detection signal Det is enabled third.

Thus, voltage generators of a voltage generating system may be enabled to operate in a sequence to generate a voltage. If the voltage is higher than a threshold voltage, the voltage generating operations of the voltage generators are interrupted or terminated. When the voltage becomes lower than the threshold voltage, the voltage generators again operate in a sequence to generate the voltage. When the voltage generators again operate to generate the voltage, the voltage generator selected to be first in the sequence may vary.

For example, when the voltage generators again perform voltage generating operations because the voltage is lower than the threshold voltage, one of the voltage generators to begin the sequence of voltage generating operations is selected. The control circuit may select the voltage generator to begin the sequence by selecting one of a plurality of enable signals to be outputted first.

While various embodiments have been described above, it will be understood to those skilled in the art that the embodiments described are examples only. Accordingly, the voltage generator, system, and method described herein should not be limited based solely on the described embodiments.

What is claimed is:

1. A voltage generator system, comprising:
a plurality of voltage generators electrically coupled to an output node, and configured to perform voltage generating operations in a sequence to produce an output voltage at the output node;
a voltage detection circuit configured to output a detection signal based on a voltage level of the output voltage; and
a control circuit configured to enable first in a sequence a voltage generator next to a voltage generator that was enabled last in the previous sequence by selectively outputting a plurality of divided oscillator signals based on an oscillator signal in response to the detection signal.

2. The voltage generator system according to claim 1, further comprising:
an oscillator configured to generate the oscillator signal in response to the detection signal; and
the control circuit being configured to output the oscillator signal in a sequence as the plurality of divided oscillator signals, to select a different one of the plurality of divided oscillator signals to be outputted first in each sequence.

3. The voltage generator system according to claim 2, wherein the control circuit comprises:
a shifting pulse generation circuit configured to generate a shifting pulse based on the detection signal and the oscillator signal;
a select signal generation circuit configured to enable in a sequence a plurality of select signals each time the shifting pulse is inputted; and
an output selection circuit configured to enable the enable signals based on the plurality of select signals, respectively, when the detection signal is enabled, and disable all the enable signals when the detection signal is disabled.

4. The voltage generator system according to claim 3, wherein the shifting pulse generation circuit is configured to output the oscillator signal as the shifting pulse during a period in which the detection signal is enabled, or to generate a pulse and output the generated pulse as the shifting pulse when the detection signal is disabled.

5. The voltage generator system according to claim 3, wherein the select signal generation circuit includes a plurality of flip-flops which are electrically coupled in a ring structure, and the respective flip-flops operate based on the oscillator signal and output the select signals, respectively.

* * * * *